(12) United States Patent
Park et al.

(10) Patent No.: US 12,235,081 B1
(45) Date of Patent: Feb. 25, 2025

(54) LASER DEVICE FOR DEFENSE AGAINST FLYING OBJECT AND OPERATION METHOD THEREOF

(71) Applicant: DUWON PHOTONICS CO., LTD., Anyang-si (KR)

(72) Inventors: Yong Won Park, Seoul (KR); Hee Won Shin, Gunpo-si (KR)

(73) Assignee: DUWON PHOTONICS CO., LTD., Anyang-si (KR)

( * ) Notice: Subject to any disclaimer, the term of this patent is extended or adjusted under 35 U.S.C. 154(b) by 0 days.

(21) Appl. No.: 18/937,182

(22) Filed: Nov. 5, 2024

Related U.S. Application Data

(63) Continuation-in-part of application No. PCT/KR2023/003979, filed on Mar. 24, 2023.

(30) Foreign Application Priority Data

May 18, 2022 (KR) .......................... 10-2022-0061136

(51) Int. Cl.
*F41H 13/00* (2006.01)
*F41H 11/00* (2006.01)
*H01S 3/00* (2006.01)

(52) U.S. Cl.
CPC ........... *F41H 13/005* (2013.01); *F41H 11/00* (2013.01); *H01S 3/0071* (2013.01)

(58) Field of Classification Search
CPC ....... F41H 13/005; F41H 11/00; H01S 3/0071
USPC .......................................................... 89/1.1
See application file for complete search history.

(56) References Cited

U.S. PATENT DOCUMENTS

| | | | | |
|---|---|---|---|---|
| 4,799,103 A * | 1/1989 | Muckerheide | ....... | H04N 13/388 348/42 |
| 8,459,801 B2 * | 6/2013 | Horimai | ................. | G03B 35/18 359/9 |
| 8,610,761 B2 * | 12/2013 | Haisty | .................. | H04N 9/3185 348/51 |

(Continued)

FOREIGN PATENT DOCUMENTS

| | | |
|---|---|---|
| JP | H06-324275 A | 11/1994 |
| JP | 2014-85646 A | 5/2014 |

(Continued)

OTHER PUBLICATIONS

International Search Report for PCT/KR2023/003979, dated Jun. 8, 2023.

*Primary Examiner* — Samir Abdosh
(74) *Attorney, Agent, or Firm* — Novick, Kim & Lee, PLLC; Jae You Kim

(57) ABSTRACT

A laser device for aircraft defense according to an embodiment of the present invention may include: a laser oscillator that outputs a laser beam; a LASER BEAM IRRADIATION AREA GENERATOR for generating a laser beam irradiation area in the air on the basis of the output laser beam; and a controller that controls the LASER BEAM IRRADIATION AREA GENERATOR to generate a laser beam irradiation plane having an energy density equal to or greater than a preset threshold in the laser beam irradiation area and controls to generate the laser beam irradiation area which is a three-dimensional space from the laser device to the laser beam irradiation surface and in which aircraft located on the laser beam irradiation area is hit with the laser beam.

12 Claims, 10 Drawing Sheets

(56) References Cited

U.S. PATENT DOCUMENTS

| | | | | |
|---|---|---|---|---|
| 2013/0188146 | A1* | 7/2013 | DeCusatis | H04N 13/365 |
| | | | | 353/7 |
| 2016/0033854 | A1* | 2/2016 | Pettitt | G03B 21/204 |
| | | | | 353/7 |
| 2023/0324708 | A1* | 10/2023 | Miyazaki | G02B 27/0101 |
| | | | | 353/14 |

FOREIGN PATENT DOCUMENTS

| KR | 10-2015-0050357 A | 5/2015 |
|---|---|---|
| KR | 10-2015-0099874 A | 9/2015 |
| KR | 10-2020377 B1 | 9/2019 |
| KR | 10-2021-0074297 A | 6/2021 |

* cited by examiner

LASER DEVICE FOR DEFENSE AGAINST FLYING OBJECT AND OPERATION METHOD THEREOF

TECHNICAL FIELD

The present invention relates to a laser device for aircraft defense and an operating method thereof. More particularly, the present invention relates to a laser device for aircraft defense by generating a three-dimensional laser irradiation area in the shape of a plane or a pyramid in the air, tracking the aircraft located on the generated irradiation area, or hitting individual or swarm-type aircraft, such as a plurality of scattered drones, on the irradiation area, and an operating method thereof.

BACKGROUND ART

Laser processing devices minimize damage to materials while using high thermal energy, maintaining processing quality at a precise and high level.

Recently, laser devices combined with various optical systems have been provided, so a focal length, an irradiation distance of a laser beam, and an energy density of an area may be controlled. Accordingly, laser processing devices that perform various processing, such as welding, cutting, and perforation, are being provided in industrial sites.

However, the processing method of such laser processing devices is limited to performing processing on a subject to be irradiated by irradiating a laser beam onto a surface of the subject to be irradiated in a vertical direction, focusing energy on a point on the surface, or continuously irradiating the laser beam in one direction. In other words, such laser processing devices have a limitation in that they may not perform simultaneous laser scanning or processing of a specific space because they irradiate the laser beam by a stationary state or linear movement of a focus.

SUMMARY

Technical Problem

The present invention provides a laser device that generates a laser beam irradiation area using a rotating mirror unit.

Specifically, the present invention is to generate a laser beam irradiation area in which destruction efficiency for one or more objects is maintained at a uniform level.

In addition, the present invention provides a laser device capable of simultaneously applying multiple physical hits to one or more objects located on a laser beam irradiation area by irradiating a laser beam to a predetermined area.

The present invention provides a laser device capable of adjusting a distance at which the laser beam irradiation area is located from the laser device by changing a focal length.

Specifically, the present invention provides a laser device capable of reconnoitering a moving object by adjusting an irradiation area of a laser beam and energy intensity within the area using various optical systems.

The present invention provides a laser device capable of variously changing an area of interest for tracking or hitting an object depending on a scan angle of a rotating mirror unit. Accordingly, a reconnaissance range of aircraft may be modulated in various ways.

Objects of the present invention are not limited to the above-mentioned objects. That is, other objects that are not described may be obviously understood by those skilled in the art to which the present invention pertains from the following description.

Technical Solution

According to an embodiment of the present invention, a laser device for aircraft defense may include: a laser oscillator that outputs a laser beam; a LASER BEAM IRRADIATION AREA GENERATOR that generates a laser beam irradiation area in the air based on the output laser beam; and a controller that controls the LASER BEAM IRRADIATION AREA GENERATOR to generate a laser beam irradiation surface having an energy density equal to or greater than a preset threshold in the laser beam irradiation area and controls to generate the laser beam irradiation area which is a three-dimensional space from the laser device to the laser beam irradiation surface and in which aircraft located on the laser beam irradiation area is hit with the laser beam.

The LASER BEAM IRRADIATION AREA GENERATOR may include: a beam transmission optical system that reflects the output laser beam and transmits the reflected output laser beam to a rotating mirror unit; and a rotating mirror unit that has a plurality of mirrors provided on a circumference and irradiates the reflected laser beam into the air through the mirror as the rotating mirror unit rotates, and the beam transmission optical system may change a focus of the output laser beam to infinity or condense the output laser beam to a predetermined position.

The LASER BEAM IRRADIATION AREA GENERATOR may further include a tilting unit that tilts a rotation axis of the rotating mirror unit, and the controller may control to generate the laser beam irradiation surface based on x-axis scanning of the rotating mirror unit and y-axis scanning performed by the tilting of the rotating mirror unit.

The LASER BEAM IRRADIATION AREA GENERATOR may further include a reflection optical system that is disposed between the beam transmission optical system and the rotating mirror unit and reflects the laser beam transmitted from the beam transmission optical system to the rotating mirror unit, and the controller may reciprocate the reflection optical system within a preset range to generate the laser beam irradiation surface based on the x-axis scanning of the rotating mirror unit and the y-axis scanning performed by the reciprocal rotation of the reflection optical system.

The LASER BEAM IRRADIATION AREA GENERATOR may further include a plurality of mirrors that are disposed along a circumference between the beam transmission optical system and the rotating mirror unit and a second rotating mirror unit that scans the laser beam transmitted from the beam transmission optical system to the rotating mirror unit as the second rotating mirror unit rotates, and the controller may generate the laser beam irradiation surface based on the x-axis scanning of the rotating mirror unit and the y-axis scanning performed by the second rotating mirror unit as the transmitted laser beam is scanned on a surface of the mirror of the rotating mirror unit by rotating the second rotating mirror unit.

The LASER BEAM IRRADIATION AREA GENERATOR may include: a beam transmission optical system that reflects the output laser beam and transmits the reflected output laser beam to a rotating mirror unit; and a rotating mirror unit that has a plurality of mirrors provided on a circumference and irradiates the reflected laser beam into the air through the mirror as the rotating mirror unit rotates, and the beam transmission optical system may be a variable focus optical system that changes a focal position.

The LASER BEAM IRRADIATION AREA GENERATOR may further include a tilting unit that tilts a rotation axis of the rotating mirror unit, and the controller may control to generate the laser beam irradiation surface based on x-axis scanning of the rotating mirror unit and y-axis scanning performed by the tilting of the rotating mirror unit.

The generated laser beam irradiation area may be a three-dimensional space including the laser beam irradiation surface located at a first focal length from the laser device, the laser device may further include a radar that identifies the aircraft located between the laser beam irradiation areas within the three-dimensional space, the beam irradiation area generating unit may include an air pump that changes a curvature of an optical surface of the variable focus optical system, and the controller may calculate a pump pressure of the air pump and control an operation of the air pump to change a curvature of a mirror surface of the variable focus optical system when the number of aircraft identified by the radar is less than a preset threshold in order to change the first focal length to a second focal length.

The controller may newly generate a laser beam irradiation area, which is a three-dimensional space including the laser beam irradiation surface located at the second focal length, from the laser device.

The laser oscillator may include a first laser oscillator and a second laser oscillator, and transmit a first laser beam output by the first laser generator to the rotating mirror unit as a first reflection beam through the beam transmission optical system and transmit a second laser beam output by the second laser generator to the rotating mirror unit as a second reflection beam that is horizontal to the first reflection beam through the beam transmission optical system, and the controller may control to generate the laser beam irradiation surface based on the x-axis scanning of the rotating mirror unit performed based on the first reflection beam and the second reflection beam and the y-axis scanning performed by the tilting of the rotating mirror unit.

The laser beam irradiation surface includes: a first scanning surface that is generated by performing the x-axis and y-axis scanning based on the first reflection beam; and a second scanning surface that is generated by performing the x-axis and y-axis scanning based on the second reflection beam.

The controller may control a reflection angle of a beam transmission optical system, a rotation speed of the rotating mirror unit, a tilting angle of the tilting unit, and a beam output of the laser oscillator to adjust a scan angle, a scan length, a scan speed, and a telecentricity error incident on an object of the laser beam.

Advantageous Effects

Although it is difficult to track and hit aircraft flying in the air as a point, according to an embodiment of the present invention, when the aircraft enters a laser beam irradiation area, a physical hit is applied to the aircraft, so it is possible to provide an effect of efficiently defending against the aircraft.

In addition, according to another embodiment of the present invention, when the number of aircraft to be hit is plural, even if each aircraft is not hit separately, it is possible to simultaneously hit the plurality of aircraft as the plurality of aircraft enter the generated laser beam irradiation area.

According to another embodiment of the present invention, the laser device may change the area of the irradiation surface and the position in the air by changing the focal length of the laser beam. As a result, it is possible to reconnoiter a wider area of aircraft at a longer distance. That is, according to an embodiment of the present invention, the laser device has a scanning function for a wide area, so it can be used not only for the purpose of destroying the aircraft, but also for the purpose of detecting the aircraft.

Meanwhile, according to an embodiment of the present invention, the layer device can be used not only for the purpose of hitting the aircraft, but also as a military weapon in itself.

The effects of the present invention are not limited to the above-described effects, and other effects that are not mentioned may be obviously understood by those skilled in the art from the following description.

DETAILED DESCRIPTION OF EXEMPLARY EMBODIMENTS

Figure 1:
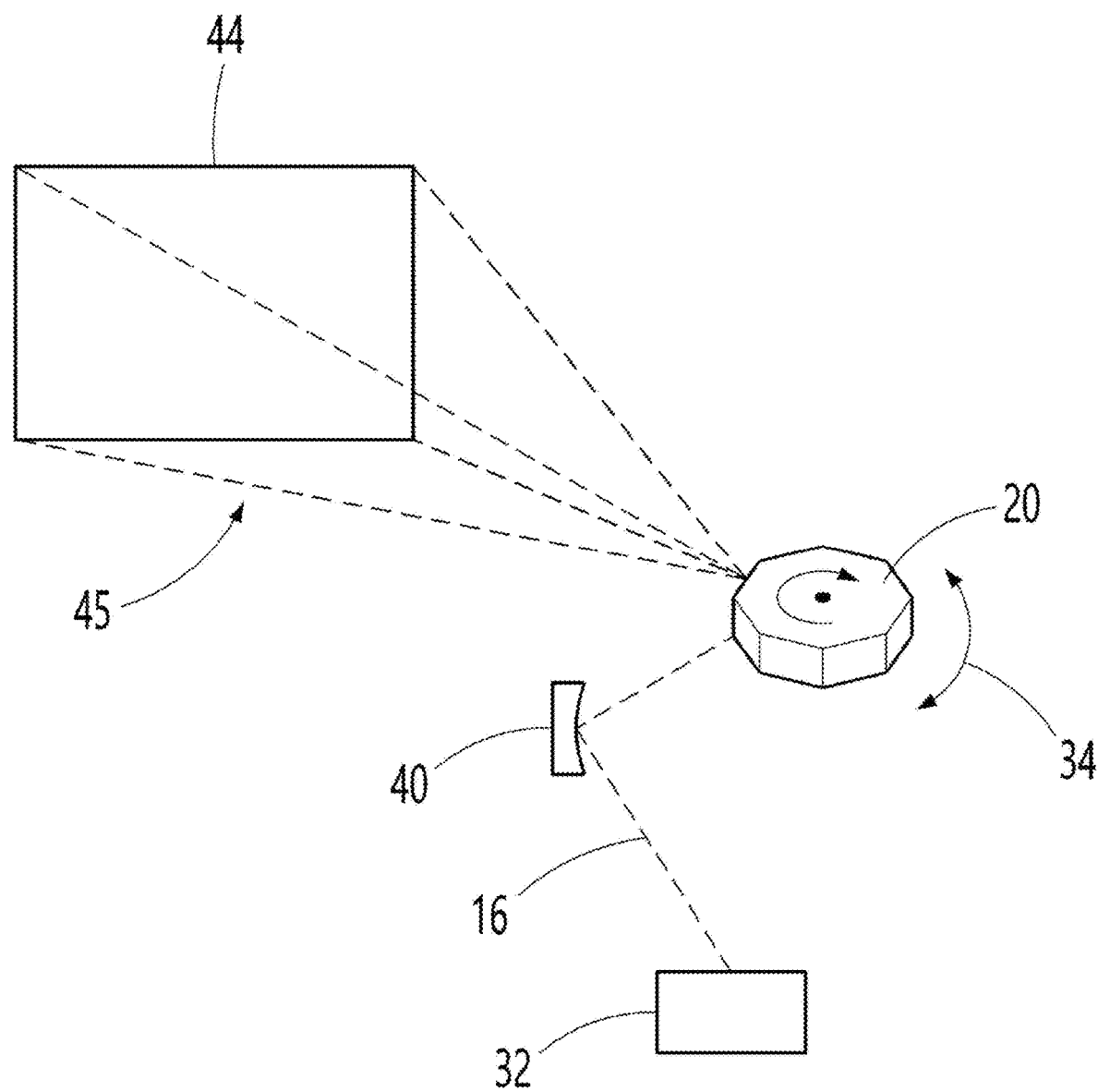
FIG. 1 is an exemplary diagram of a laser device for aircraft defense according to an embodiment of the present invention.

Hereinafter, embodiments of the present invention will be described in detail with reference to the accompanying drawings. Various advantages and features of the present invention and methods accomplishing the same will become apparent from the following detailed description of embodiments with reference to the accompanying drawings. However, the present invention is not limited to embodiments to be disclosed below, but may be implemented in various different forms, these embodiments will be provided only in order to make the present invention complete and allow one of ordinary skill in the art to which the present invention pertains to completely recognize the scope of the present invention, and the present invention will be defined by the scope of the claims. Throughout the specification, the same components will be denoted by the same reference numerals.

Unless defined otherwise, all the terms, including technical and scientific terms, used herein have the same meaning as meanings commonly understood by one of ordinary skill in the art to which the present invention pertains. In addition, the terms defined in generally used dictionaries are not ideally or excessively interpreted unless they are specifically defined clearly. As used herein, the terms are for describing embodiments rather than limiting the present invention. Unless explicitly described to the contrary, a singular form includes a plural form in the present specification.

Hereinafter, in this specification, a laser device for aircraft defense may be referred to as a laser device or a laser scanner.

FIG. 1 is an exemplary diagram of a laser device for aircraft defense according to an embodiment of the present invention.

Referring to FIG. 1, the laser device may include a laser oscillator 32, a beam transmission optical system 40, and a rotating mirror unit 20.

The laser oscillator 32 according to an embodiment of the present invention may generate a high-power beam for destroying an object, for example, aircraft such as a drone.

According to an embodiment, the laser oscillator 32 may generate a laser beam irradiation surface 44 having an energy density equal to or greater than a preset threshold in a laser beam irradiation area 45 of FIG. 1.

In another embodiment, the laser oscillator 32 may generate a beam of output for at least disabling an optical sensor of the drone. When the optical sensor is disabling, the drone loses controllability. In addition, when a motor or a propeller is destroyed, the power of the drone is lost, so the flight capability of the drone is lost.

In another embodiment, the laser oscillator 32 may generate a beam of output for scanning drone's emergence, a drone's flight direction, a drone's flight speed, etc., in a predetermined area.

The beam transmission optical system 40 according to an embodiment may be an infinite focus optical system.

The beam transmission optical system 40 according to another embodiment may be a condensing optical system.

Alternatively, according to an embodiment of the present invention, the beam transmission optical system 40 may include an optical system in which an infinite focus optical system and a condensing optical system are combined in a composite manner.

The infinite focus optical system and the condensing optical system may each be a reflective mirror or a transmissive lens.

The rotating mirror unit 20 may be, for example, a polygonal mirror, but the embodiment of the present invention is not limited thereto.

Referring to FIG. 1, a laser beam 16 generated by the laser oscillator 32 is transmitted to the rotating mirror unit 20 through the beam transmission optical system 40.

In this case, the rotating mirror unit 20 rotates at high speed around a rotation axis and performs x-axis scanning on a focal length of the rotating mirror unit 20.

According to an embodiment of the present invention, the rotating mirror unit 20 generates a reflection angle 34 of a mirror surface by performing a tilting or reciprocating rotational movement of the rotation axis, and the y-axis scanning may be performed on the focal length of the rotating mirror unit 20 by this reflection angle 34.

For example, when the beam transmission optical system 40 is the infinite focus optical system or the condensing optical system, the laser beam 16 of the laser oscillator 32 is transmitted to the rotating mirror unit 20 and the focus of the beam changes to infinity or is condensed at a required location.

Next, the transmitted laser beam 16 may be scanned along the x-axis and y-axis by the rotating mirror unit 20.

As described above, by the x-axis scanning and y-axis scanning of the rotating mirror unit 20, a laser beam irradiation surface 44 may be generated on the focal length of the laser beam 16 from the rotating mirror unit 20.

The laser beam irradiation surface 44 may be, for example, a virtual surface of laser energy limit required for destroying or disabling aircraft.

For convenience of description, the laser beam irradiation surface 44 of FIG. 1 is depicted as a two-dimensional plane, and in reality, there is an area having a similar concentration and may have a predetermined thickness.

That is, in this specification, the location where the focus of the laser beam is formed has the highest energy and the best destruction efficiency for the aircraft, which is expressed as 'laser irradiation surface 44' for convenience. In reality, however, the location is an area having a predetermined thickness, not a surface.

According to an embodiment, the laser beam irradiation area 45 may be a three-dimensional space from a launching point of the mirror surface of the laser device or the rotating mirror unit 20 to the laser beam irradiation surface 44, and may be a square pyramid-shaped space as illustrated in FIG. 1.

The entire area of the laser beam irradiation area 45 is an effective range for hitting aircraft, and is a space where aircraft located on the laser beam irradiation area 45 may be hit with the laser beam 16.

Although not illustrated, the laser device may include a controller that controls the overall operation of each component of the laser device and controls to generate the laser beam irradiation area 45. Meanwhile, according to an embodiment of the present invention, the rotating mirror unit 20 and the laser oscillator 32 may be combined in plural numbers. When the number of laser oscillators 32 is plural, the laser oscillators 32 may be arranged vertically, but the embodiment of the present invention is not limited thereto.

Figure 2:
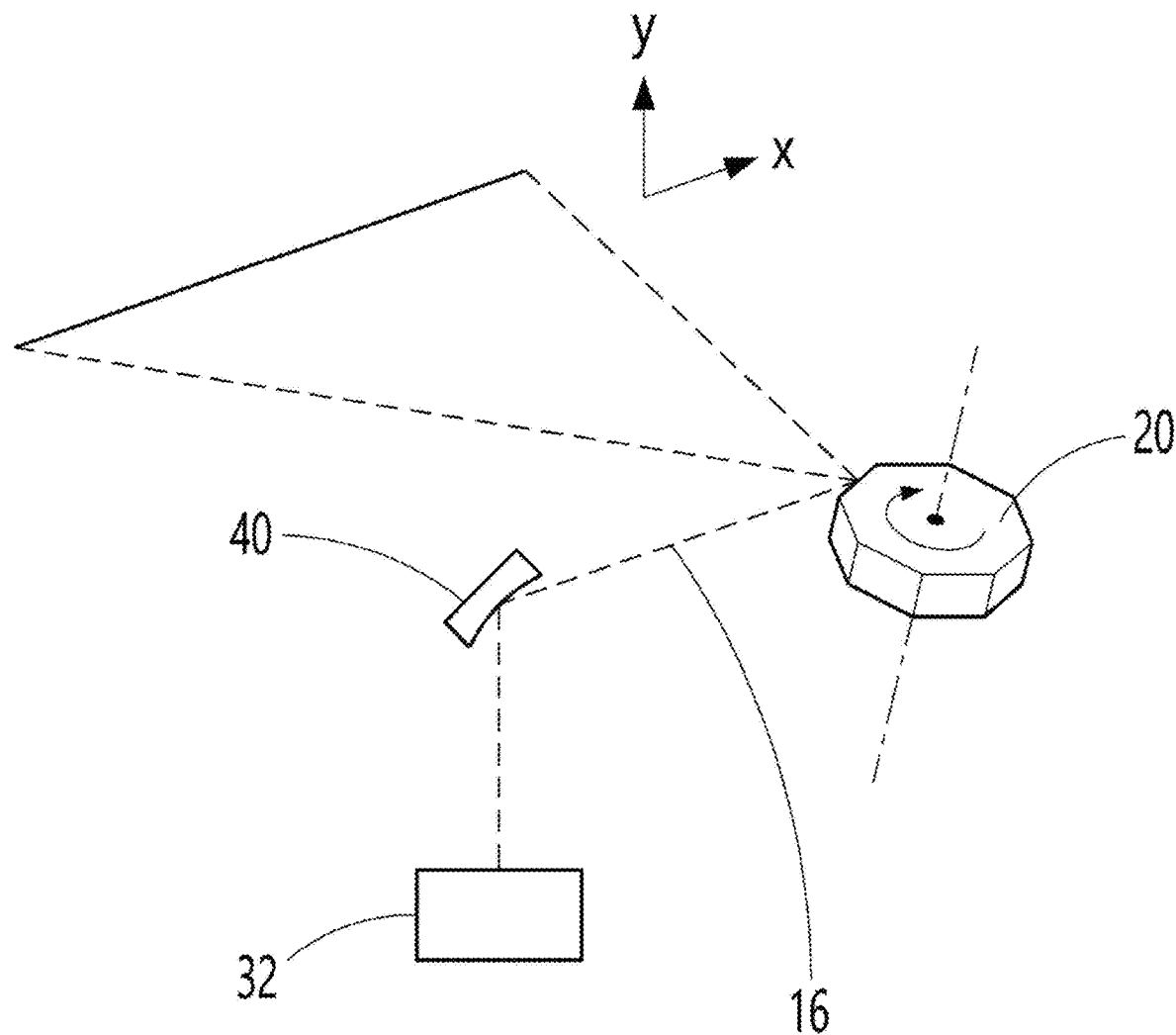
FIG. 2 is an exemplary diagram illustrating an example of one-axis scanning of the laser device for aircraft defense of FIG. 1.

FIG. 2 is an exemplary diagram illustrating an example of one-axis scanning of the laser device for aircraft defense of FIG. 1. FIG. 2 is an example of the simplest configuration of the laser device of FIG. 1, and is an example of a one-dimensional scan configuration in which the laser beam 16 is irradiated only in one axis, x-axis, direction.

Referring to FIG. 2, the laser beam 16 may be output by the laser oscillator 32 and transmitted to the rotating mirror unit 20 through the beam transmission optical system 40. In this case, the rotating mirror unit 20 rotates and performs the one-axis, x-axis, scan by reflecting and scanning the laser beam 16.

FIG. 2 is an example of a case where the laser device of FIG. 1 does not tilt the rotating mirror unit 20, and when the rotation axis of the rotating mirror unit 20 is tilted in a reciprocating rotational movement manner, the laser device generates the reflection angle 34 of the mirror surface of the rotating mirror unit 20 as illustrated in FIG. 1.

Figure 3:
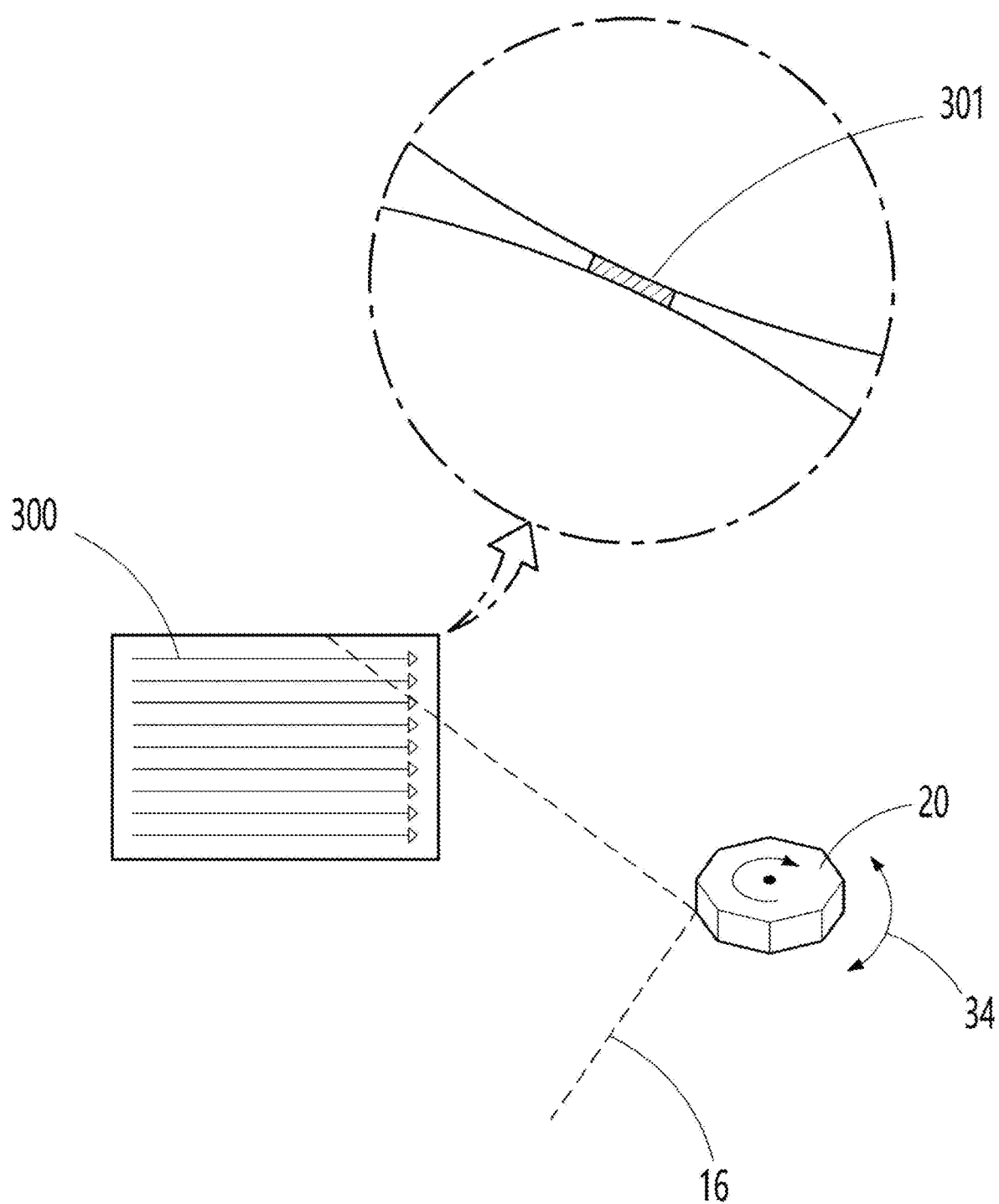
FIG. 3 is an exemplary diagram showing an example of scanning using a condensing optical system to the laser device for aircraft defense of FIG. 1.

FIG. 3 is an exemplary diagram showing an example of scanning using a condensing optical system to the laser device for aircraft defense of FIG. 1.

Referring to FIG. 3, the laser device performs the one-axis, x-axis, scan, and irradiates the laser beam in a straight line 300 in a direction of an arrow from the left to the right.

In this case, the tilting of the rotating mirror unit 20 generates a plurality of arrow straight lines in a y-axis direction that is horizontal to an arrow straight line 300 by the reflection angle 34 of the mirror surface, so a predetermined laser beam irradiation surface is generated.

The arrow straight line 300 constituting the laser beam irradiation surface is expressed as the straight line 300 for convenience, but may be an area having a thickness 301 with a similar concentration located at the focal length of the laser beam 16 of the laser device.

In FIG. 3, the laser beam irradiation surface at a location where the energy density of the laser beam 16 is high and the destruction efficiency is high is illustrated as an example.

Figure 4A:
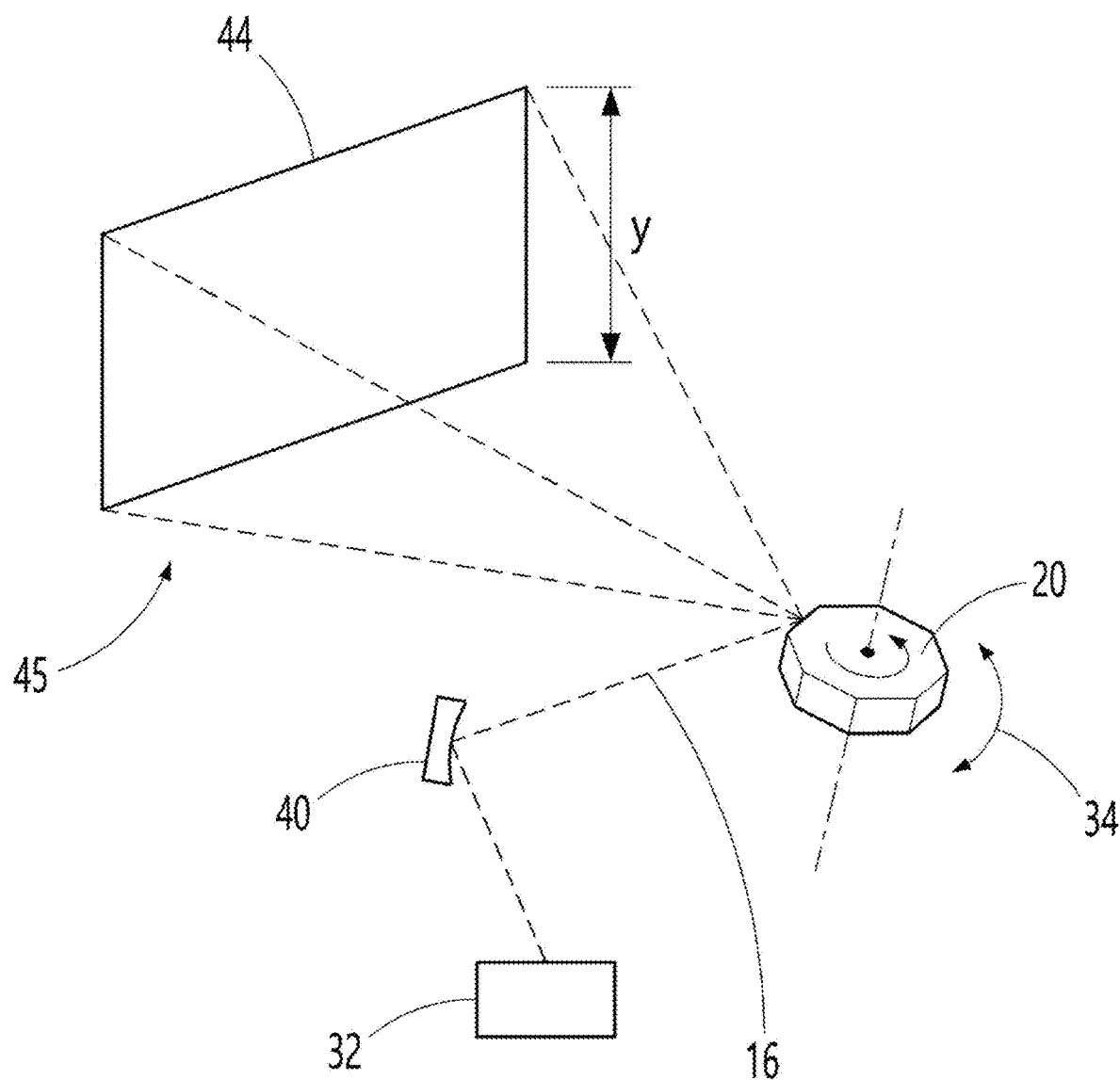
FIGS. 4A to 4C are exemplary diagrams illustrating an example of generating a laser beam irradiation area of the laser device for aircraft defense of FIG. 1.
Figure 4B:
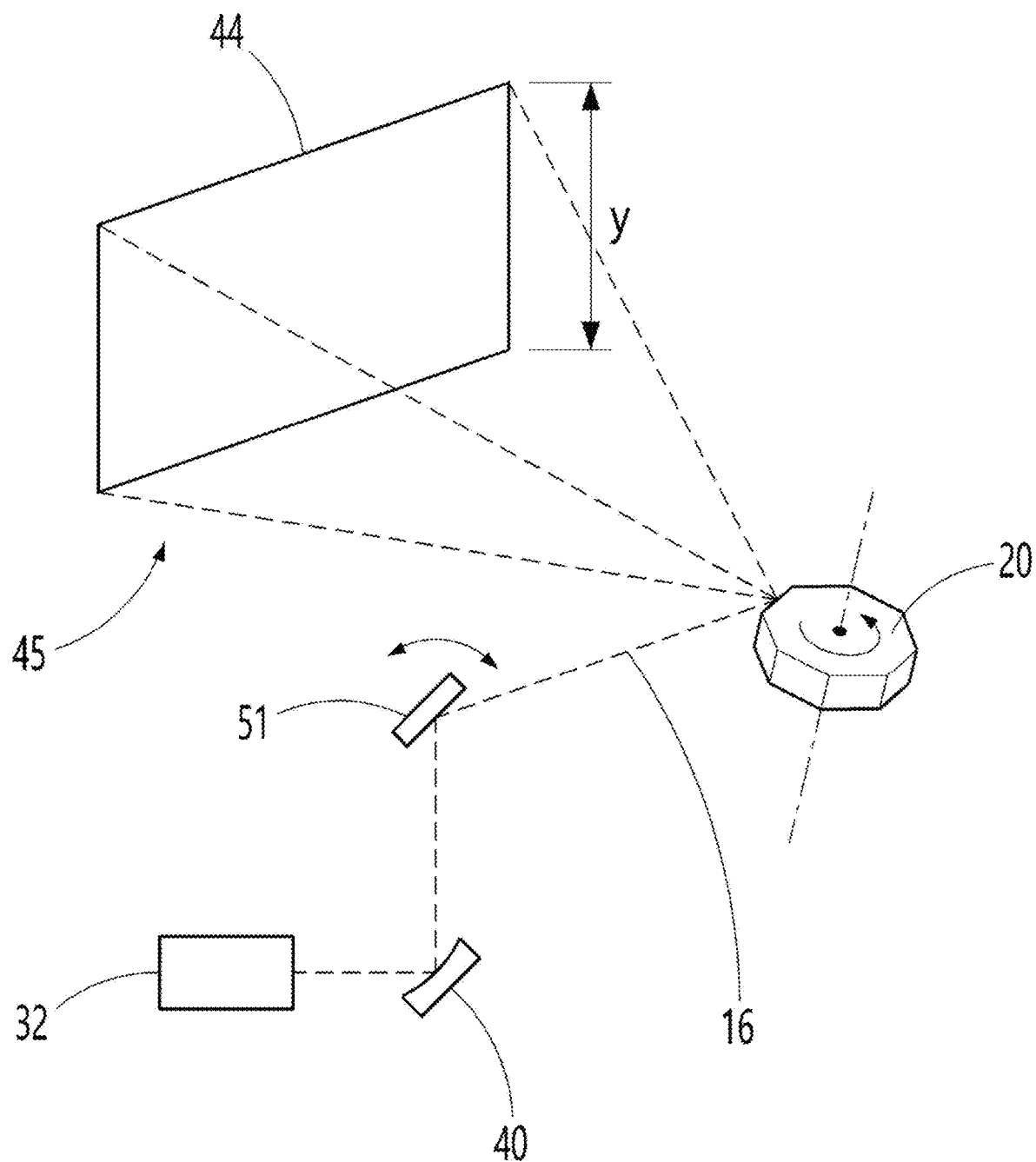
Figure 4C:
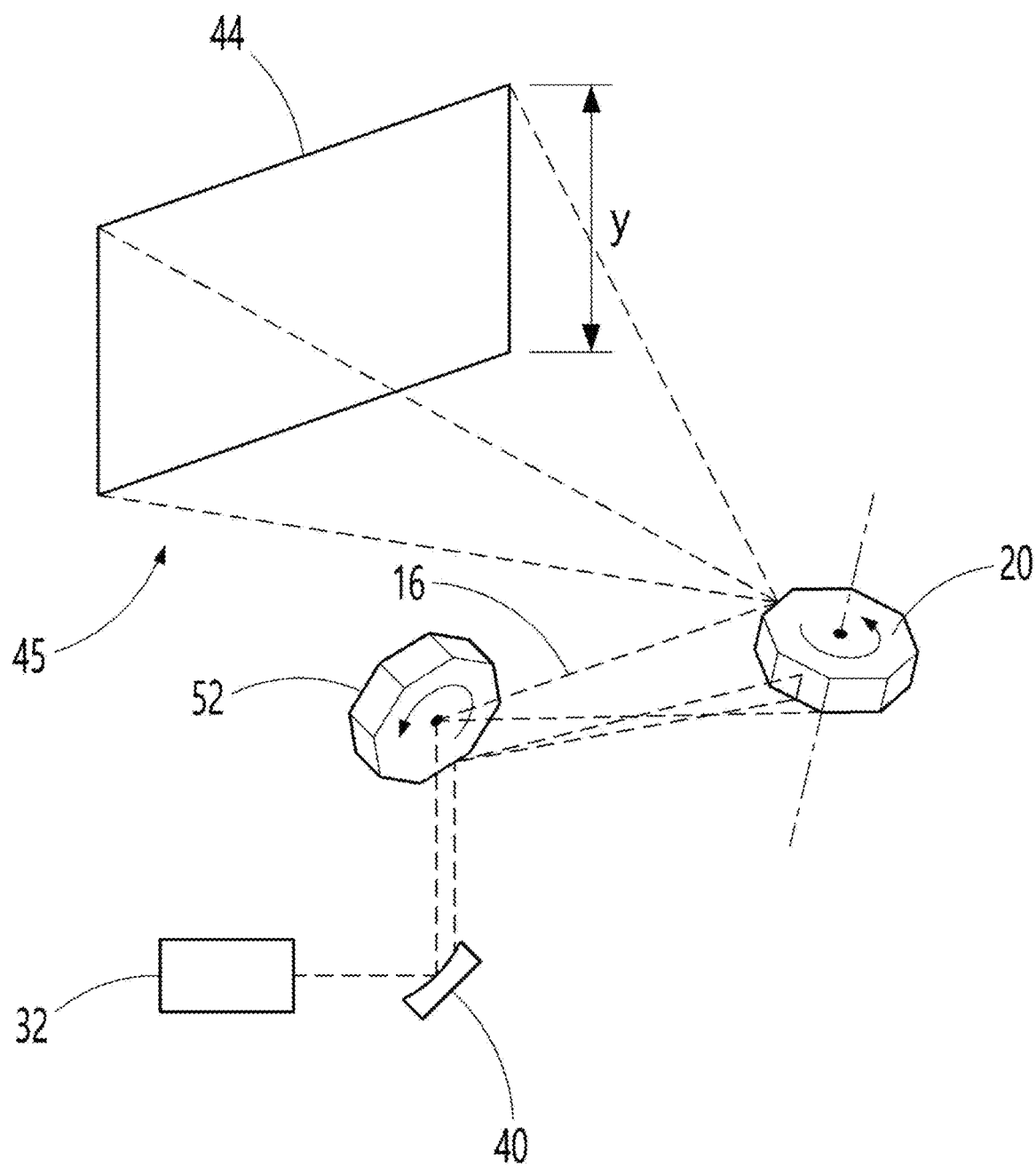

FIGS. 4A to 4C are exemplary diagrams illustrating an example of generating the laser beam irradiation area of the laser device for aircraft defense of FIG. 1.

In FIG. 4A, the laser oscillator 32 generates a high-power beam.

The rotating mirror unit 20 performs the x-axis scanning through the rotational movement, and performs the y-axis scanning by vertical movement, that is, reciprocating tilting of the rotation axis of the rotating mirror unit 20. In FIG. 4A, the high-power beam of the laser oscillator 32 may be made into a three-dimensional space in the shape of a square pyramid. The space within the square pyramid shape 45 corresponds to an effective range at which a drone is destroyed. In particular, the destruction effect may further increase when an infinite optical system is used.

The configuration of FIG. 4A is advantageous in that it is easy to use an optical system with excellent heat durability due to the nature of the weapon, and thus, it is easy to use a very high output. In addition, since the y-axis scanning is slow, the time for the fast x-axis scanning to be repeatedly irradiated to a target increases, and thus, the energy concentration on the same axis is high, so it is easy to use as a weapon for the purpose of destruction.

FIG. 4B is an example of the laser device that performs the y-axis scanning by tilting the reflection optical system 51, unlike the embodiment of FIG. 4A in which the y-axis scanning is performed by tilting the rotating mirror unit 20.

The laser beam 16 is output by the laser oscillator 32, and the laser beam 16 transmitted by the beam transmission optical system 40 is transmitted to the rotating mirror unit 20 through the reflection optical system 51.

The rotating mirror unit 16 performs the x-axis scanning. In this case, the laser beam 16 is irradiated back and forth along the y-axis on the mirror surface of the rotating mirror unit 20 by tilting the reflection optical system 51, thereby performing the y-axis scanning on the focal length in the air.

The configuration of FIG. 4B may adjust the tilting angle of the reflection optical system 51 while having a moderately fast y-axis scanning speed, making it easy to control the size of the surface on which the laser beam is irradiated. Also, considering the agile operation and control convenience, it is advantageous to configure the reflection optical system 51 to be small. In this case, however, the reflection optical system 51 has disadvantages for high power and long-term use.

FIG. 4C is an example of the laser device that performs the y-axis scanning by tilting the second rotating mirror unit 52, unlike the embodiment of FIG. 4B in which the y-axis scanning is performed by tilting the reflection optical system 51. The rotating mirror unit 20 may be referred to as the first rotating mirror unit to distinguish it from the second rotating mirror unit 52.

Referring to FIG. 4C, the second rotating mirror unit 52 performs the y-axis scanning, and the first rotating mirror unit 20 performs the x-axis scanning.

Depending on the arrangement of the two rotating mirror units, the x-axis scanning may be performed before the y-axis scanning, and the angles of the two scanning directions may be configured as any angle other than 90°.

When using the plurality of rotating mirror units 52 and 20 as illustrated in FIG. 4C, the rotating mirror units 52 and 20 have advantages in that it has good high-power response and a very fast scanning speed. However, the rotating mirror units 52 and 20 are more useful as a detector that quickly scans a wide area to identify a location of an enemy's weapon rather than for the purpose of destruction.

Figure 5:
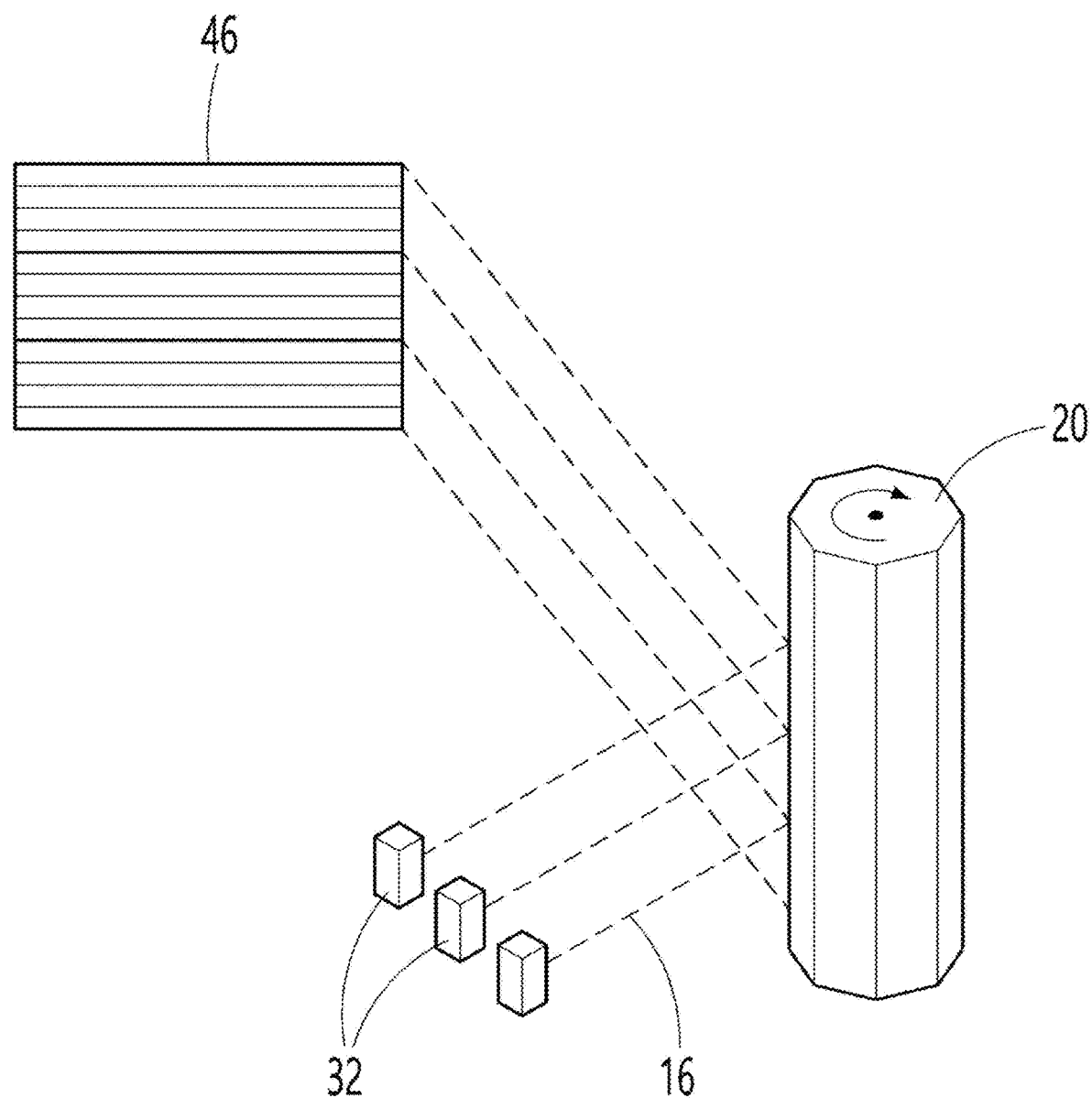
FIG. 5 is an exemplary diagram of the laser device for aircraft defense to which a plurality of laser oscillators is applied according to another embodiment of the present invention.

FIG. 5 is an exemplary diagram of the laser device for aircraft defense to which a plurality of laser oscillators is applied according to another embodiment of the present invention.

Referring to FIG. 5, the laser device includes the plurality of laser oscillators 32 and the rotating mirror unit 20.

The laser oscillator 32 may include the plurality of laser oscillators. For example, the laser oscillator 32 may include a first laser oscillator and a second laser oscillator.

A first laser beam output by the first laser oscillator may be transmitted to the rotating mirror unit 20 as a first reflection beam through a beam transmission optical system.

In addition, a second laser beam output by the second laser oscillator may be transmitted to the rotating mirror unit as a second reflection beam that is horizontal to the first reflection beam through the beam transmission optical system.

The beam transmission optical system between the plurality of laser oscillators 32 and the rotating mirror unit 20 may include an infinite focus optical system or a condensing optical system.

According to another embodiment, instead of the plurality of laser oscillators 32, a single laser oscillator may be used, and a splitter capable of splitting a beam may be used at the rear end of the infinite focus optical system or the condensing optical system to split the beam into multiple laser beams and incident on the rotating mirror unit 2.

According to another embodiment of the present invention, as illustrated in FIG. 4, the laser beam may also be directly transmitted from the laser oscillator 32 to the rotating mirror unit 20 without the beam transmission optical system. The rotating mirror unit 20 reflects the first laser beam and the second laser beam.

In particular, in FIG. 5, a laser beam irradiation surface 46 including a first scanning surface generated by performing the x-axis and y-axis scanning based on the first reflected beam from which the first laser beam is reflected, and a second scanning surface generated by performing the x-axis and y-axis scanning based on the second reflected beam from which the second laser beam is reflected is illustrated as an example.

Figure 6:
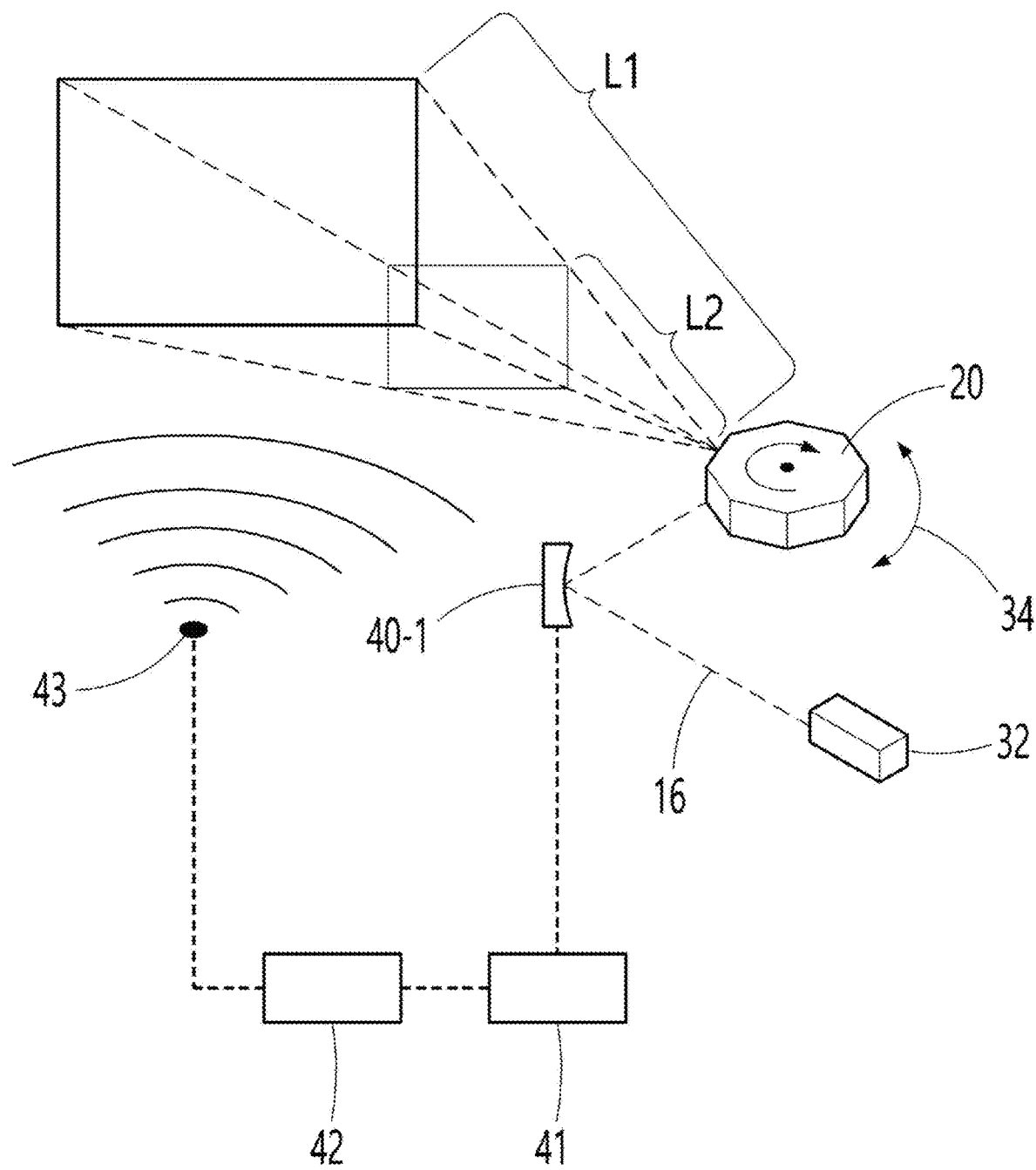
FIG. 6 is an exemplary diagram of the laser device for aircraft defense to which a variable focus optical system is applied according to another embodiment of the present invention.

FIG. 6 is an exemplary diagram of the laser device for aircraft defense to which a variable focus optical system is applied according to another embodiment of the present invention.

In particular, FIG. 6 is an example of the laser device that uses the variable focus optical system instead of the infinite focus optical system or the condensing optical system to increase the efficiency of disabling a target whose location can be determined by the present invention.

Referring to FIG. 6, the laser device may include a radar 43, a variable focus optical system 40-1, an air pump 41, and an operator 42. Here, the operator 42 may calculate a pressure of the air pump and may be included in the controller of the laser device.

The radar 43 may identify aircraft located between the laser beam irradiation areas.

The laser device may detect a plurality of aircraft, for example, a distance L1 or L2 with the highest density of a group of drones, by using the radar 43 for the purpose of detecting the location, and may change a curvature of an optical surface of the variable focus optical system 40-1 so that a focus is formed on the location L1 or L2.

The variable focus optical system 40-1 is configured to change the curvature of the optical surface by adjusting air pressure inside the mirror. The laser device may calculate a pump pressure of the air pump 41 and operate the air pump 41.

The focal length L1 or L2 changes by changing the curvature of the mirror surface of the variable focus optical system 40-1. The focal length L1 or L2 is not fixed and is actively variable.

In FIG. 6, the controller may calculate the pump pressure of the air pump 41 and control the operation of the air pump 41 when the number of aircraft identified by the radar 43 is less than a preset threshold.

The laser device may change a first focal length to a second focal length by changing the curvature of the mirror surface of the variable focus optical system 40-1.

Accordingly, the laser beam irradiation area may be newly generated. In FIG. 6, the case where the laser beam irradiation area is a square pyramid is illustrated. In particular, the focal length L1 or L2 is variable, so the laser beam irradiation surface may be widened or narrowed.

Figure 7:
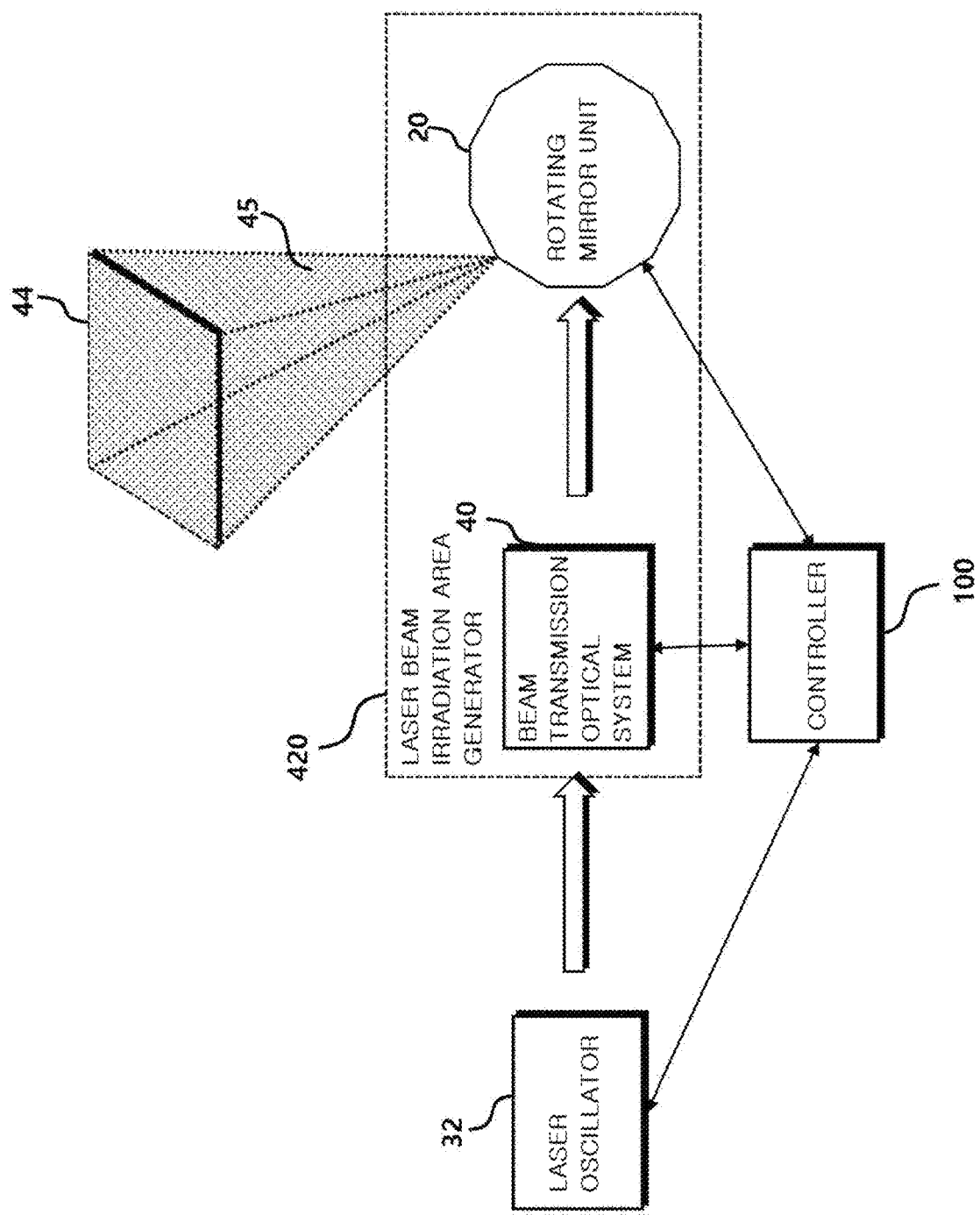
FIG. 7 is a block diagram of the laser device for aircraft defense according to an embodiment of the present invention.

FIG. 7 is a block diagram of the laser device for aircraft defense according to an embodiment of the present invention.

Referring to FIG. 7, the laser beam output by the laser oscillator 32 is transmitted to a LASER BEAM IRRADIATION AREA GENERATOR 420, so the laser beam irradiation surface 44 is irradiated.

The LASER BEAM IRRADIATION AREA GENERATOR 420 may generate the laser beam irradiation area in the air based on the laser beam output from the laser oscillator 32.

The LASER BEAM IRRADIATION AREA GENERATOR 420 may include, for example, the infinite focus optical system or the condensing optical system.

In another embodiment, the LASER BEAM IRRADIATION AREA GENERATOR 420 may include the variable focus optical system.

The LASER BEAM IRRADIATION AREA GENERATOR 420 may include the rotating mirror unit 20. In addition, although not illustrated, the LASER BEAM IRRADIATION AREA GENERATOR 420 may include at least one of the tilting unit for tilting the rotating mirror unit 20 and the tilting unit for tilting the reflection optical system included in the beam transmission optical system.

In addition, the LASER BEAM IRRADIATION AREA GENERATOR 420 may generate the laser beam area 45 including the laser beam irradiation surface 44 by the reflection of the rotating mirror unit 20.

Meanwhile, the controller 100 controls the overall operation and function of each component of the laser device. To this end, the controller 100 may be configured to include one or more processors. The controller 100 may be configured to include a central processing unit CPU, a micro processor unit MPU, a micro controller unit MCU, or any type of processor well known in the technical field of the present invention. The controller 100 may also include a memory, for example, a RAM, as a component. In addition, the controller 100 may store at least one application or program for executing a method according to an embodiment of the present invention.

According to an embodiment of the present invention, the controller 100 may control a reflection angle of the beam transmission optical system 40, a rotation speed of the rotating mirror unit, a tilting angle of the tilting unit, and a beam output of the laser oscillator to adjust a scan angle, a scan length, a scan speed, and a telecentricity error incident on an object of the laser beam.

Figure 8:
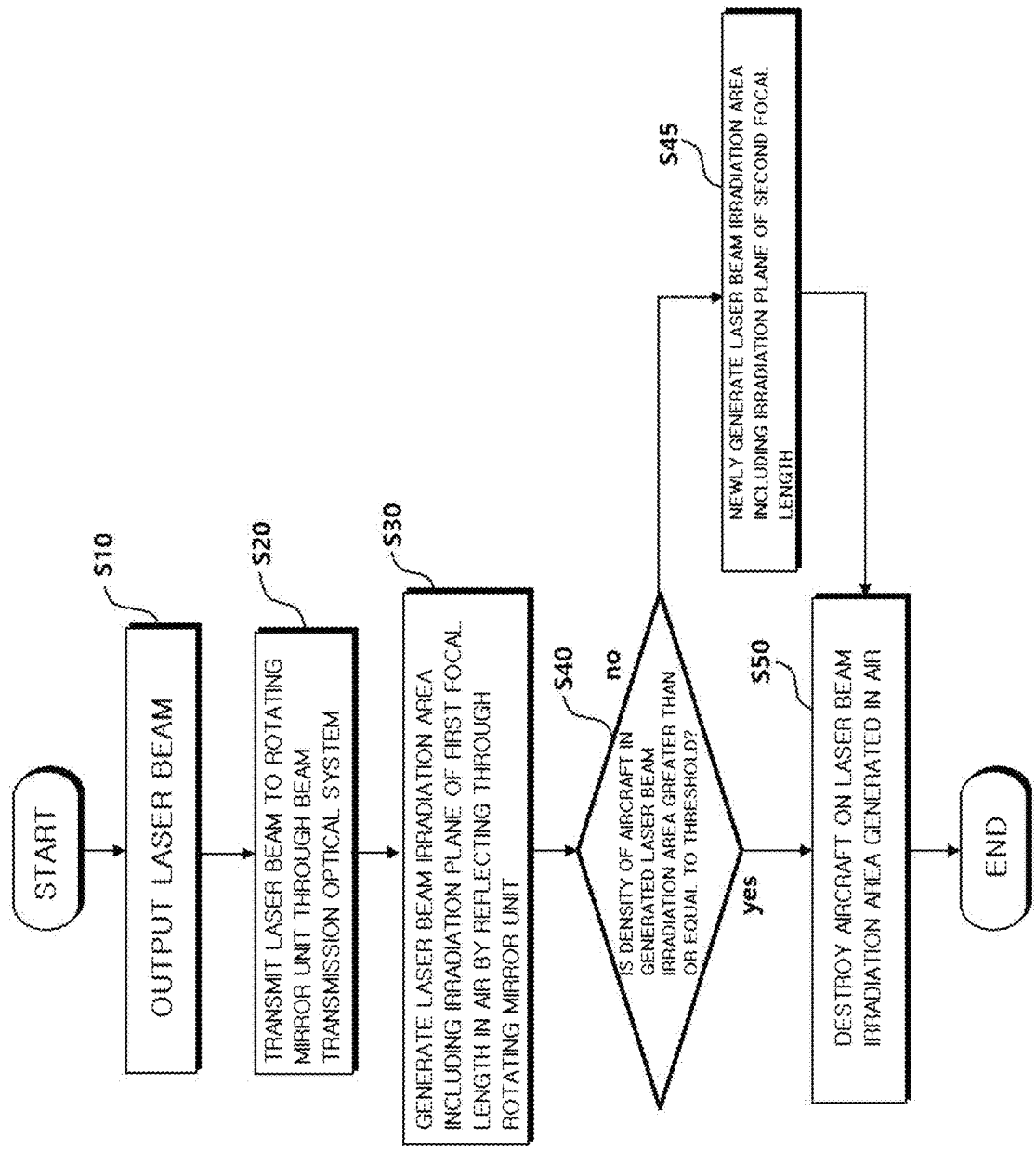
FIG. 8 is a flowchart of a method of operating a laser device for aircraft defense of FIG. 7.

FIG. 8 is a flowchart of a method of operating a laser device for aircraft defense of FIG. 7. Each step of FIG. 8 is performed by the laser device, and specifically, may be performed by the calculation of the controller of the laser device.

Referring to FIG. 8, the laser device outputs the laser beam through the laser oscillator 32, S10.

The laser device may transmit the laser beam to the rotating mirror unit 20 through the beam transmission optical system in S20.

The laser device may generate the laser beam irradiation area including a laser irradiation surface, first irradiation surface, located at the first focal length in the air by reflecting the laser beam through the rotating mirror unit 20 in S30.

The laser device may determine whether the density of the aircraft within the generated laser beam irradiation area is equal to or greater than a threshold in S40. Accordingly, when the density of the aircraft is equal to or greater than the threshold, the laser device may destroy the aircraft on the laser beam irradiation area generated in the air in S50.

On the other hand, when the density of the aircraft is less than the threshold, the laser device may newly generate a laser beam irradiation area including a laser irradiation surface, second irradiation surface, located at the second focal length in S45.

The determination and/or calculation methods of a controller 100 according to an embodiment of the present invention described with reference to the accompanying drawings so far may be performed by executing a computer program implemented as a computer-readable code. The computer program may be transmitted from a first computing device to a second computing device through a network such as the Internet, installed in the second computing device, and thus used in the second computing device. Both of the first computing device and the second computing device include a server device, a fixed computing device such as a desktop PC, and a mobile computing device such as a notebook, a smartphone, and a tablet PC.

The embodiments of the present invention have been described hereinabove with reference to the accompanying drawings, but it will be understood by one of ordinary skill in the art to which the present invention pertains that various modifications and alterations may be made without departing from the technical spirit or essential feature of the present invention. Therefore, it is to be understood that the embodiments described hereinabove are illustrative rather than being restrictive in all aspects.

The invention claimed is:

1. A laser device for aircraft defense, comprising:
    a laser oscillator that outputs a laser beam;
    a LASER BEAM IRRADIATION AREA GENERATOR that generates a square pyramid-shaped laser beam irradiation area in air based on the output laser beam; and
    a controller that controls the LASER BEAM IRRADIATION AREA GENERATOR to generate a square pyramid-shaped laser beam irradiation surface having an energy density equal to or greater than a preset threshold in the square pyramid-shaped laser beam irradiation area and controls to generate the square pyramid-shaped laser beam irradiation area which is a three-dimensional space from the laser device to the square pyramid-shaped laser beam irradiation surface and in which aircraft located on the square pyramid-shaped laser beam irradiation area is hit with the laser beam,
wherein the LASER BEAM IRRADIATION AREA GENERATOR includes:
a beam transmission optical system that reflects the output laser beam and transmits the reflected output laser beam to a rotating mirror unit;
a rotating mirror unit that has a plurality of mirrors provided on a circumference and irradiates the reflected laser beam into the air through the mirror as the rotating mirror unit rotates;
a tilting unit that tilts a rotation axis of the rotating mirror unit; and
the controller controls to generate the square pyramid-shaped laser beam irradiation surface based on x-axis scanning of the rotating mirror unit and y-axis scanning performed by the tilting of the rotating mirror unit.

2. The laser device of claim 1, wherein the beam transmission optical system changes a focus of the output laser beam to infinity or condenses the output laser beam to a predetermined position.

3. A laser device for aircraft defense, comprising:
a laser oscillator that outputs a laser beam;
a LASER BEAM IRRADIATION AREA GENERATOR that generates a square pyramid-shaped laser beam irradiation area in air based on the output laser beam; and
a controller that controls the LASER BEAM IRRADIATION AREA GENERATOR to generate a square pyramid-shaped laser beam irradiation surface having an energy density equal to or greater than a preset threshold in the square pyramid-shaped laser beam irradiation area and controls to generate the square pyramid-shaped laser beam irradiation area which is a three-dimensional space from the laser device to the square pyramid-shaped laser beam irradiation surface and in which aircraft located on the square pyramid-shaped laser beam irradiation area is hit with the laser beam,
wherein the LASER BEAM IRRADIATION AREA GENERATOR includes:
a beam transmission optical system that reflects the output laser beam and transmits the reflected output laser beam to a reflection optical system;
the reflection optical system that is disposed between the beam transmission optical system and the rotating mirror unit and reflects the laser beam transmitted from the beam transmission optical system to the rotating mirror unit;
a rotating mirror unit that has a plurality of mirrors provided on a circumference and irradiates the reflected laser beam into the air through the mirror as the rotating mirror unit rotates; and
the controller reciprocates the reflection optical system within a preset range to generate the square pyramid-shaped laser beam irradiation surface based on the x-axis scanning of the rotating mirror unit and the y-axis scanning performed by the reciprocal rotation of the reflection optical system.

4. A laser device for aircraft defense, comprising:
a laser oscillator that outputs a laser beam;
a LASER BEAM IRRADIATION AREA GENERATOR that generates a square pyramid-shaped laser beam irradiation area in air based on the output laser beam; and
a controller that controls the LASER BEAM IRRADIATION AREA GENERATOR to generate a square pyramid-shaped laser beam irradiation surface having an energy density equal to or greater than a preset threshold in the square pyramid-shaped laser beam irradiation area and controls to generate the square pyramid-shaped laser beam irradiation area which is a three-dimensional space from the laser device to the square pyramid-shaped laser beam irradiation surface and in which aircraft located on the square pyramid-shaped laser beam irradiation area is hit with the laser beam,
wherein the LASER BEAM IRRADIATION AREA GENERATOR includes:
a beam transmission optical system that reflects the output laser beam and transmits the reflected output laser beam to a second rotating mirror unit;
the second rotating mirror unit that is located between the beam transmission optical system and a first rotating mirror unit, has a plurality of mirrors along a circumference, and scans the laser beam reflected from the beam transmission optical system to the first rotating mirror unit as the second rotating mirror unit rotates;
the first rotating mirror unit that has a plurality of mirrors on a circumference and emits the reflected laser beam through the plurality of mirrors into the air as the first rotating mirror unit rotates; and
the controller controls the second rotating mirror unit to rotate so that the reflected laser beam is scanned on a surface of the plurality of mirrors of the first rotating mirror unit in order to generate the square pyramid-shaped laser beam irradiation surface based on the x-axis scanning of the first rotating mirror unit and the y-axis scanning performed by the second rotating mirror unit.

5. The laser device of claim 1, wherein the beam transmission optical system is a variable focus optical system that changes a focal position.

6. The laser device of claim 5, wherein the LASER BEAM IRRADIATION AREA GENERATOR further includes an air pump that changes a curvature of an optical surface of the variable focus optical system, and
the controller calculates a pump pressure of the air pump and controls an operation of the air pump to change a curvature of a mirror surface of the variable focus optical system in order to change the first focal length to a second focal length.

7. The laser device of claim 5, wherein the generated square pyramid-shaped laser beam irradiation area is a three-dimensional space including the square pyramid-shaped laser beam irradiation surface located at a first focal length from the laser device,
the laser device further includes a radar that identifies the aircraft located between the square pyramid-shaped laser beam irradiation areas within the three-dimensional space,
the beam irradiation area generating unit includes an air pump that changes a curvature of an optical surface of the variable focus optical system, and
the controller calculates a pump pressure of the air pump and controls an operation of the air pump to change a curvature of a mirror surface of the variable focus optical system when the number of aircraft identified by the radar is less than a preset threshold in order to change the first focal length to a second focal length.

8. The laser device of claim 6, wherein the controller newly generates a square pyramid-shaped laser beam irradiation area, which is a three-dimensional space including the square pyramid-shaped laser beam irradiation surface located at the second focal length, from the laser device.

9. The laser device of claim 7, wherein the controller newly generates a square pyramid-shaped laser beam irradiation area, which is a three-dimensional space including the square pyramid-shaped laser beam irradiation surface located at the second focal length, from the laser device.

10. A laser device for aircraft defense, comprising:
a laser oscillator that outputs a laser beam;
a LASER BEAM IRRADIATION AREA GENERATOR that generates a square pyramid-shaped laser beam irradiation area in air based on the output laser beam; and
a controller that controls the LASER BEAM IRRADIATION AREA GENERATOR to generate a square pyramid-shaped laser beam irradiation surface having an energy density equal to or greater than a preset threshold in the square pyramid-shaped laser beam irradiation area and controls to generate the square pyramid-shaped laser beam irradiation area which is a three-dimensional space from the laser device to the square pyramid-shaped laser beam irradiation surface and in which aircraft located on the square pyramid-shaped laser beam irradiation area is hit with the laser beam,
wherein the laser oscillator includes a first laser oscillator and a second laser oscillator, and transmits a first laser beam output by the first laser oscillator to a rotating mirror unit as a first reflection beam through the beam transmission optical system and transmits a second laser beam output by the second laser oscillator to the rotating mirror unit as a second reflection beam that is horizontal to the first reflection beam through the beam transmission optical system,
the LASER BEAM IRRADIATION AREA GENERATOR includes:
a beam transmission optical system that reflects the output laser beam and transmits the reflected output laser beam to a rotating mirror unit;
a rotating mirror unit that has a plurality of mirrors provided on a circumference and irradiates the reflected laser beam into the air through the mirror as the rotating mirror unit rotates;
a tilting unit that tilts a rotation axis of the rotating mirror unit; and
the controller controls to generate the square pyramid-shaped laser beam irradiation surface based on x-axis scanning of the rotating mirror unit performed based on the first reflection beam and the second reflection beam and y-axis scanning performed by the tilting of the rotating mirror unit.

11. The laser device of claim 10, wherein the square pyramid-shaped laser beam irradiation surface includes:
a first scanning surface that is generated by performing the x-axis and y-axis scanning based on the first reflection beam; and
a second scanning surface that is generated by performing the x-axis and y-axis scanning based on the second reflection beam.

12. The laser device of claim 3, wherein the controller controls an reflection angle of a beam transmission optical system, a rotation speed of the rotating mirror unit, a tilting angle of the tilting unit, and a beam output of the laser oscillator to adjust a scan angle, a scan length, a scan speed, and a telecentricity error incident on an object of the laser beam.

* * * * *